Patented Dec. 6, 1938

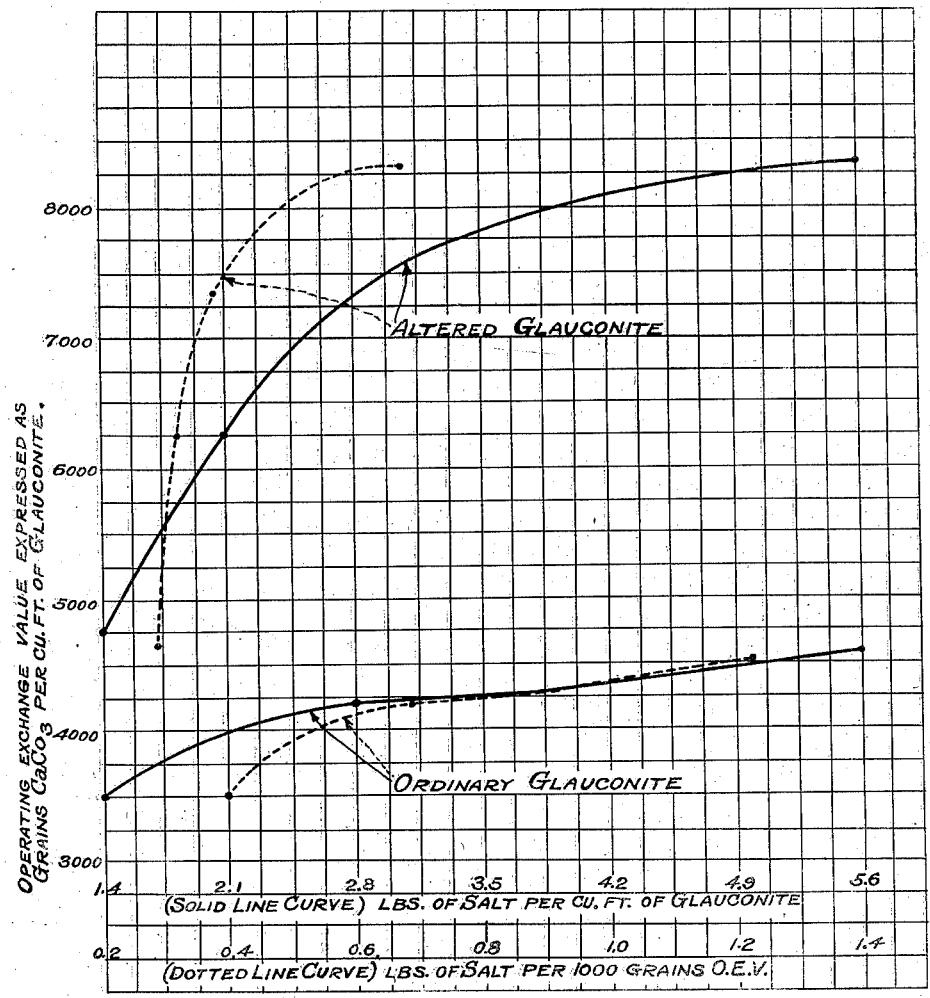

2,139,299

UNITED STATES PATENT OFFICE 2,139,299

ALTERED GLAUCONITE AND METHOD OF ALTERING

William McAfee Bruce, Mount Holly, N. J., and Ray Riley, Long Island City, N. Y., assignors to The Permutit Company, New York, N. Y., a corporation of Delaware Substitute for application Serial No. 676,548, June 19, 1933. This application April 6, 1936, Serial No. 73,034

19 Claims. (Cl. 23—111)

This invention relates to altered glauconites and methods of altering; and it comprises as a new material useful in zeolitic water softening a glauconite preparation composed of porous grains showing evidences of drastic chemical attack, being of lowered weight per unit volume than glauconite, being often highly magnetic and having a characteristic high operating exchange value in softening water, this "operating exchange value", based upon using the same amount of salt in regeneration, being 50 per cent or so greater than that of comparable commercial glauconite preparations and showing a characteristic sharp increase with an increase of salt; and it further comprises a method of producing such an altered glauconite wherein ordinary glauconite is subjected to energetic chemical attack, as by superficial reduction at a high temperature with dehydration and shrinkage, and is then subjected to treatment with a hot strong caustic soda solution, the thus treated material being ordinarily then stabilized by various chemical solutions; all as more fully hereinafter set forth and as claimed.

Glauconite is a cryptocrystalline lamellar granular mineral of marine origin. In composition, the type mineral is a hydrated silicate of iron and potassium. As it occurs glauconite invariably contains both ferrous and ferric iron. Some alumina may occur, replacing $Fe_2O_3$ and similarly other bases ($Na_2O$, $CaO$, $MgO$) may replace $K_2O$ to some extent. Possibly the $FeO$ is a replacing base. The water of hydration or of crystallization is usually of the order of 5 to 6 per cent of the glauconite. The mineral is the characteristic constituent of the greensand marls in which it occurs in admixture with many other things, clay, shells, organic matters, pyrites, etc.

Commercial glauconite is a greensand preparation in extensive use in the zeolitic process of softening water and has valuable characteristics for this purpose which are different from those of synthetic zeolites, such as those made in the wet and dry ways. For example, glauconite has great physical ruggedness and durability in use. Natural glauconite prior to use is usually subjected to some sort of a treatment to stabilize its surfaces and to prevent changes in it by the action of water in the softener. Glauconite exposed to underground waters is in a different surface condition from glauconite after use for a time in softening water and these preliminary treatments are usually advisable. Very many methods of stabilizing natural glauconites have been proposed; and some are in use. Many methods have been suggested for also incidentally increasing the exchange power, but these are mostly impractical. Any improvement in exchange power resulting from these treatments is usually more or less transitory; all glauconites, after a period of use in softening water, tend to come to about the same exchange power; to the same steady state.

The exchange power of glauconite or a zeolite is difficult to determine with accuracy. Comparable results can only be obtained by consideration of many variables. Grain size, depth of bed, velocity of exchange, amount of salt, etc. are all factors. The total exchange power can be determined by treating with hard water to completely exhaust the softening power and then with a sufficient amount of salt solution in regeneration to effect complete removal of calcium and magnesium taken up by the glauconite. The values so obtained are however of little practical use since in a commercial softener the amount of salt used cannot be unlimited. Nor are the physical and other conditions in an actual working softener those which obtain in a laboratory test; using a narrow experimental tube for example. Commercially, it is necessary to deal with the average exhaustion per unit volume of a zeolite bed of considerable width and depth. In practice the upper layers of the zeolite bed, in a downflow softener, are more exhausted than the lower layers and softening is usually stopped before complete exhaustion of the lowermost layers. In commercial operation it is found that variations in the amount of salt used in regeneration and the exchange power of the bed as a whole are functionally related. For this reason, laboratory determinations of exchange power using definite limited amounts of salt in regeneration have more practical value. This method may be here called determination of the operating exchange value. In the present invention an altered glauconite is made possessing higher operating exchange value than that of the best grades of glauconite preparations on the market; the increase, as a matter of fact, being great enough to require extensive modification in the design of commercial softening apparatus using it. The behavior towards salt solution is quite unlike that of unaltered glauconite; being characteristic of the new material.

As stated, natural glauconite is usually treated in some way prior to use. These treatments, while stabilizing the surfaces of the granules, do not materially attack them or alter their appearance or other properties. The granule remains substantially unchanged. All glauconite treated in these ways, after a period of use, as stated, comes to a steady state in which the operating exchange value is not very different between different glauconite preparations. A cubic foot of a typical commercial glauconite preparation in a commercial type of down-flow softener can be relied upon to remove about 3000 grains of hardness, calculated as CaCO₃, from flowing water with the use of 1.4 pounds of salt in regeneration. In laboratory operation using testing tubes, and with accurate control of conditions this figure may rise to 3500 grains of hardness per cubic foot of glauconite regenerated with 1.4 pounds of salt. In commercial operation it is found that if the stated amount of salt used in regeneration is doubled, there is somewhat more exchange power, but not much more. In the laboratory test the increase will be from about 3500 to about 4200 grains upon increase of salt consumption from 1.4 pounds to 2.8 pounds per cubic foot. The use of four times as much salt, or 5.6 pounds, may raise the exchange power to 4500 grains.

It has been found that by certain drastic treatments of natural glauconite effecting extensive alteration of the granules and a superficial drastic change in chemical composition, a new type of material may be made in which the operating exchange capacity can be raised 50 per cent or more as compared with the original glauconite in the steady state; meaning that with the same quantity of salt used in regeneration per cubic foot of the new softening agent, about 50 per cent more water can be softened between regenerations than is the case with commercial water softening glauconites. In other words, using a given amount of salt in regeneration the operating exchange power of the new material is enormously higher than that of the old. This increased exchange capacity in operation is associated with a sharp increase of exchange value with increasing amounts of salt used in regeneration; results in this respect being of a kind entirely different from those obtained with unaltered glauconite. Doubling the amount of salt in regeneration may increase the operating exchange value by 60 per cent or more.

The best method we now know of obtaining the new material of the present invention, an altered glauconite having these high and different operating exchange values, is to reduce glauconite grains superficially by employment of high temperatures and plenty of reducing agent. The temperature is, however, not carried to the slagging or sintering point and the reducing conditions are not sufficiently drastic to produce metallic iron. The treatment however produces a drastic chemical attack upon the granule surfaces. We have, in various operations in this step of our process, heated glauconite in the presence of heavy oil (to furnish reduction) to various temperatures between 850 and 1200° F. The oiled glauconite is, for example, placed in a rotating drum and exposed to direct heat from fire gases. Or the hot glauconite is sprayed with oil and heating continued for a time, say 30 minutes. This treatment produces superficial reduction in the granules with dehydration and shrinkage.

We next extract the cooled reduced and dehydrated material by hot, strong caustic soda solution. Solution strengths ranging from 15 to 50 per cent NaOH are suitable. The soda extracts considerable matter, chiefly silica. It also adds exchangeable sodium to the material and develops the extraordinary exchange power characterizing the material of the present invention. The extracting solution may be reused several times with different lots of reduced glauconite before being discarded. It may finally be purified and brought back to 40° Baumé and may then be used like fresh solution. We sometimes admix commercial water glass or sodium metasilicate with fresh caustic soda solution to reduce and regularize the solvent action on silica. This is not necessary with reused solution, or when a little old solution is admixed with the fresh solution; is "recycled".

After the caustic soda extraction, the glauconite is washed, the first washings being saved to utilize contained caustic soda. The glauconite at this time has the high operating exchange value mentioned, but its surfaces are not in a steady state; it is better to stabilize them. One efficient way of stabilizing the treated glauconite is to wash it with a weak solution of silicate of soda. This apparently reinstates some silica removed by the extraction by the strong caustic soda. The material treated with silicate of soda is next washed. To complete the stabilization, we commonly next treat the glauconite with a weak solution of commercial aluminum sulfate. The material is then washed and dried to commercial dryness and is then ready for use in a softener.

In the process as described, the first or heating step has the effect of dehydrating the glauconite causing shrinkage and loss of porosity with forfeiture of the original natural base exchange power of the glauconite. The subsequent drastic extraction with hot strong caustic soda solution develops a new porosity and a new exchange power.

The altered glauconite, so obtained, displays the high operating exchange value described. Under a low power magnification, the surfaces evince signs of alteration; there is evidence of extensive and drastic chemical attack; etching or corrosion, so to speak. Preparations made in the manner just described, by high heat under reducing conditions, etc., are quite magnetic; being more magnetic than is the original glauconite. The altered glauconite is also more porous and of a correspondingly lowered weight per unit volume. Ordinary glauconite preparations, such as are largely used in softening water in this country, rank as non-porous. The altered glauconite of the present invention is distinctly porous. The apparent weight per unit volume of the new material made as just described runs from 70 to 75 pounds per cubic foot, while good commercial glauconite preparations average 80 to 90 pounds per cubic foot as contained in a water softener. This lower weight per unit volume is coupled with the stated greater porosity of the altered glauconite; its porosity being from 30 to 35 per cent of the total granule volume, as compared with a porosity of 15 to 20 per cent in ordinary commercial glauconites. The altered glauconite has a new or artificial porosity replacing the natural porosity of glauconite granules. In spite of its lessened density and increased exchange value, the altered glauconite is resistant to hot water, acid water, etc. It retains the physical ruggedness and durability of the original glauconite. In use with aggressive or hot water, it does not sludge or break up to any substantial degree. It does not develop turbidity in the softener. The ratio of ferrous to ferric iron in material made by high temperature reduction is higher than in the original material.

In the accompanying illustrations are shown certain curves illustrating characteristics of the new material as compared with the commercial glauconites.

In this showing, the upper solid line curve shows the behavior of an average sample of the new altered zeolite. The lower solid line curve shows the behavior of ordinary commercial glauconite preparations. The solid line curves for both materials plot comparative operating exchange values with respect to the amount of salt used in regeneration; the amount of salt used per cubic foot of base exchange material. The upper and lower broken line curves show the values plotted in another way, the comparison being of operating exchange value with respect to the amount of salt used in removing 1000 grains of hardness from water.

The curves for the altered glauconite are derived from an average sample taken from a number of large scale batches. The several batches used in making this average sample varied from each other to a small extent; but not sufficiently to change the general shape of the curve or indeed to change the curve values materially. The graph for ordinary glauconite represents a composite of a great many values obtained from time to time. These values, in turn, do not differ materially from each other.

It will be noted that the altered glauconite with a salt consumption of 1.4 pounds per cubic foot in regeneration exhibits around 4700 grains operative softening capacity, while the ordinary glauconite with this amount of salt shows around 3500 grains.

It will be noted that upon doubling the amount of salt, using 2.8 pounds per cubic foot of material (which is not an unreasonable amount), the operating exchange value of the ordinary glauconite goes up comparatively little; to about 4200 grains. Commercially this increase in capacity is generally not worth the cost of the extra salt. On the other hand, doubling the amount of salt with the new type of softening agent raises the exchange value from about 4700 grains to about 7400 grains; a 60 per cent increase. An increase of this order is often worth while in operating a softener; it is often advisable to increase the amount of salt somewhat for the sake of the gain in softening capacity.

The same values are used in the curves shown in broken lines but the relations there expressed are the operating exchange value compared with the weight of salt used in regeneration per 1000 grains of operating exchange value.

In a particular embodiment of the present invention, a batch of good, clean, sized glauconite granules was moistened with a commercial heavy fuel oil and the mixture heated by a direct flame heat to a temperature ending at 1200° F. The heating required one to two hours in the apparatus used which chanced to be a rotary, internally fired kiln. This heating caused a marked shrinkage in the granules measured by a decrease in porosity to about 14 per cent from about 18 per cent in the original glauconite, a 25 per cent decrease. The greater part of the water of hydration was removed, the material showing by analysis 1.5 per cent combined water as compared with 6.0 per cent in the original glauconite before alteration. The altered material had a weight of 100 pounds per cubic foot as against 95 pounds per cubic foot of the original glauconite granules. The material as altered by the drastic heating showed an operating exchange value of less than 100 grains per cubic foot using 1.4 pounds salt in regeneration and 150 grains with 2.8 pounds salt. The hot altered glauconite was cooled and transferred to a steam heated, open kettle where it was treated with strong caustic soda solution heated to about 200–220° F. for about 60 minutes. The caustic soda liquor was removed and the glauconite drained and washed. It was then stirred with a 4° Baumé solution of commercial water glass, or silicate of soda. It was then drained, washed and similarly treated with a 2.5° Baumé solution of sulfate of alumina, or alum. It was then washed to get rid of the acid reaction and was ready for use in a softener.

In this particular operation, the amount of heavy fuel oil used in reduction was 2 quarts per cubic foot of cleaned glauconite. The treatment of the reduced material with caustic soda was with about 15 gallons of a solution of 40° Be. containing 50 pounds of solid caustic per cubic foot of the reduced material. After the caustic treatment the material was drained and then washed, first with about two thirds its volume of water. The caustic liquor drained off and the first wash water contained the greater part of the caustic soda and considerable silica. The drainings and wash water were made up for treatment of a second batch of reduced glauconite by addition of about 20 pounds of solid caustic per cubic foot of the altered glauconite treated.

While we have spoken of very strong caustic soda solutions, in practice we can use caustic liquor of somewhat less strength by prolonging the time of action or by raising the temperature and working under pressure. A solution of about 15 to 55 per cent NaOH in open kettles with a digestion time of 2 hours down to ½ hour is convenient.

In the reduction of the glauconite at high temperatures, instead of mixing the reducing agent with the glauconite, oil or reducing gas may be introduced into the furnace during the heating or after the desired temperature has been reached. In the described operation, we used heavy commercial fuel oil as a reducing body. In various work, however, we have used many other reducing agents, among them hydrogen, city gas, commercial liquefied tank gas and many others. All these reducing agents give results of like character; but we find the use of heavy oil convenient and economical.

While we have described more particularly making the new altered glauconite of our invention by an energetic chemical attack consisting in employing first energetic reduction and then digestion in caustic soda solution, we have found that preparations of analogous properties and also of high operating exchange value can be made in other ways involving energetic chemical attack. In one such way the glauconite, instead of being reduced, is oxidized by air at a temperature around a red heat and is thereafter digested with 40° Baumé caustic soda solution as before. This also gives a preparation of high operating exchange power. Similarly, a good base exchange material can be made by treating clean glauconite with a little strong acid; not enough to decompose and gelatinize the grains but enough to produce a superficial attack. In so doing, the glauconite granules are afterwards digested with strong caustic soda solution.

Preparations can be made in either way which are analogous to the new glauconite made in the way more particularly described. The properties are much the same save that the magnetic value is not so materially increased. Any material made from glauconite with chemical and physical alteration by energetic chemical attack in the ways described, used with a slightly increased daily consumption of salt, gives an enormously increased output of softened water in a given apparatus installation. For example, it has been found possible to increase softening capacity from 75 to 80 per cent by substituting altered glauconite for ordinary glauconite and increasing the daily salt consumption not more than 50 per cent.

The improvement in exchange power effected in the production of the altered glauconite of the present invention is permanent. The altered glauconite in a softener quickly comes to a steady state and in this steady state, the improved exchange power persists. In the steady state the altered glauconite contains more exchangeable soda per unit weight or per unit volume than the ordinary glauconites of the prior art in the steady state.

This application contains matter also appearing in application Serial No. 676,548, filed June 19, 1933, and is filed as a substitute therefor.

What we claim is:—

1. A regenerative base-exchange material comprising altered glauconite granules having a permanently high operating exchange value in softening water, said value being increased by 50 per cent or more upon doubling the amount of salt used in regeneration, said altered glauconite being produced by heating glauconite granules under reducing and dehydrating conditions to temperatures from 850° to 1200° F. for a time sufficient to remove the greater part of the water of hydration with loss of porosity and exchange power followed by digesting the heat treated granules in hot strong caustic alkali solution developing said high operating exchange value.

2. The material of claim 1 when of highly magnetic character and exhibiting a high ratio of ferrous to ferric iron.

3. A process of improving glauconite for base exchange purposes through heat treatment of the glauconite followed by treatment in an alkaline solution, characterized by heating to temperatures above 850° F. under reducing conditions removing the greater part of the water of hydration with substantial destruction of porosity and of operating base exchange value and by subsequently extracting the heat treated reduced material with hot strong caustic soda solution creating a new and greater porosity and operating exchange value by dissolving out silica and adding exchangeable sodium to the pore surfaces.

4. The process of making from glauconite a radically altered product having radically greater operating exchange power in water softening and capable of being regenerated with radically less salt per unit of hardness removed from the water, wherein glauconite granules are first heated to temperatures above 850° F. under reducing conditions and for a time sufficient to radically alter the granules in chemical and physical respects including removal of the greater part of the water of hydration with greater decrease in porosity and in operating exchange power and thereafter the heat treated granules are treated with hot strong caustic alkali solution of a strength and for a time sufficient to develop porosity in the granules of an order fifty per cent greater than that of the original glauconite granules and also to develop said greater operating exchange power.

5. In the process of claim 4 the employment of a hot, strong caustic soda solution.

6. In the process of claim 4 the employment of a hot, strong caustic soda solution containing dissolved sodium metasilicate.

7. In the method of claim 4 employment of temperatures of the order of 850 to 1250° F.

8. In the method of claim 4 mixing the glauconite with a heavy oil and bringing the mixture to a temperature of 850 to 1250° F.

9. In the method of claim 4 employing a caustic soda solution of about 40° Baumé.

10. In the method of claim 4 treating the material after digesting with caustic soda with successive washes of a weak solution of silicate of soda and of a weak solution of alumina.

11. In the alteration of glauconite to a material radically different in chemical and physical respects including 50 per cent greater porosity and operating exchange power for softening water, the combination of two process steps comprising first subjecting glauconite granules to a drastic heat treatment at temperatures above 850° F. under strongly reducing and dehydrating conditions decreasing porosity, removing the greater part of the water of hydration and forfeiting operating exchange power to a major extent and thereafter extracting the granules with hot strong caustic soda solution of such strength and for such time as to develop said new and greater granule porosity and said new and greater operating exchange power.

12. For the purpose of altering glauconite to a material radically different in chemical and physical respects including at least 50 per cent greater porosity and operating base exchange power, the process which comprises exposing glauconite granules to temperatures above 850° F. under strongly reducing and dehydrating conditions removing the greater part of the water of hydration, decreasing porosity and destroying operating exchange power, thereafter extracting the granules with a strong caustic alkali solution of such strength and for such time as to develop said new and greater porosity and said new and greater operating exchange power and thereafter stabilizing the material.

13. In manufacturing from natural glauconite a base exchange material radically different from glauconite and of greatly increased porosity and operating exchange power, a process which comprises altering glauconite by heating it in granular form in the presence of a reducing agent mixed therewith to temperatures between 850° and 1250° F. with maintenance of dehydrating conditions and for a time sufficient to destroy porosity and operating exchange power and by subsequently treating the reduced and dehydrated material with hot strong caustic soda solution to extract silica and to add exchangeable sodium until porosity and operating exchange power are 50 per cent greater as compared with the original glauconite.

14. In the manufacture from glauconite of altered preparations having greatly increased porosity and greatly increased operating exchange value of a different type, said value increasing sharply and substantially with increase of salt used in regeneration, the process which comprises first destroying the porosity and exchange value of glauconite granules by heating them under reducing and dehydrating conditions to temperatures above 850° F. removing most of the water of hydration and thereafter developing said greater porosity and operating exchange value in the altered granules by subjecting them to a drastic treatment with hot strong caustic soda solution extracting silica and adding exchangeable sodium.

15. A process for treating glauconite to make a material of increased base exchange power which comprises subjecting glauconite granules to a heat treatment under reducing conditions at temperatures of 850–1250° F. removing the greater part of the water of hydration and subsequently extracting the granules with hot strong caustic alkali solution of a concentration greater than 15 per cent for a period of one to two hours.

16. A base exchange material manufactured from purified glauconite and having the characteristics of glauconite granules altered chemically and physically by heating under dehydrating and reducing conditions removing the greater part of the water of hydration and destroying porosity and exchange value followed by digestion in hot strong caustic soda solution imparting a new and greater porosity and an artificial operating exchange value above 5500 grains $CaCO_3$ equivalent upon regeneration with not more than 2.25 pounds salt per cubic foot of said altered granules, said exchange value increasing sharply in direct proportion with the relative amount of salt used in regeneration, said imparted exchange value being associated with lessened silica and added sodium content in the new pore surfaces.

17. A regenerative base-exchange material comprising altered glauconite granules showing by laboratory test a permanent operating exchange value exceeding 4500 grains $CaCO_3$ equivalent per cubic foot of the granules when regenerated with 1.4 pounds of salt and an increase of said value of at least 50 per cent when regenerated with 2.8 pounds salt per cubic foot, said altered glauconite being produced by heating glauconite granules under reducing and dehydrating conditions to temperatures above 850° F. for a time sufficient to remove the greater part of the water of hydration with loss of porosity and exchange power followed by digesting the heat treated granules in hot caustic soda solution developing said operating exchange value.

18. Altered glauconite granules showing by laboratory test an operating base-exchange value exceeding 4500 grains $CaCO_3$ equivalent per cubic foot of the altered granules when regenerated with 1.4 pounds salt and a value exceeding 6000 grains $CaCO_3$ when regenerated with 2.1 pounds salt per cubic foot, said altered glauconite being produced by heating glauconite granules under reducing and dehydrating conditions to temperatures above 850° F. for a time sufficient to remove the greater part of the water of hydration with loss of porosity and exchange power followed by digesting the heat treated granules in hot strong caustic soda solution developing said operating exchange value.

19. Altered glauconite granules characterized by an artificial operating base-exchange value exceeding 5500 grains hardness as $CaCO_3$ per cubic foot of granules upon regeneration with not more than 0.4 pound salt per 1000 grains of said hardness removed from water, said altered glauconite being produced by heating glauconite granules under reducing and dehydrating conditions to temperatures above 850° F. for a time sufficient to remove the greater part of the water of hydration with loss of porosity and exchange power followed by digesting the heat treated granules in hot strong caustic soda solution developing said artificial operating exchange value.

WILLIAM McAFEE BRUCE.
RAY RILEY.